I. COLEMAN.
FASTENING.
APPLICATION FILED FEB. 6, 1909.

930,840.

Patented Aug. 10, 1909.

WITNESSES

INVENTOR
Isidor Coleman
BY
ATTORNEYS

UNITED STATES PATENT OFFICE.

ISIDOR COLEMAN, OF NEW YORK, N. Y.

FASTENING.

No. 930,840.　　　　　Specification of Letters Patent.　　　　Patented Aug. 10, 1909.

Application filed February 6, 1909. Serial No. 476,375.

*To all whom it may concern:*

Be it known that I, ISIDOR COLEMAN, a subject of the Czar of Russia, and a resident of the city of New York, borough of Manhattan, in the county and State of New York, have invented a new and Improved Fastening, of which the following is a full, clear, and exact description.

The invention relates to eye glasses and spectacles, and its object is to provide a new and improved device for securely fastening the frame and lenses together without the use of screws, and for this purpose use is made of a stud held on a post lug and extending through an aperture in the lens, the free end of the stud being engaged by a locking device having connection with the post.

A practical embodiment of the invention is represented in the accompanying drawings forming a part of this specification, in which similar characters of reference indicate corresponding parts in all the views.

Figure 1:
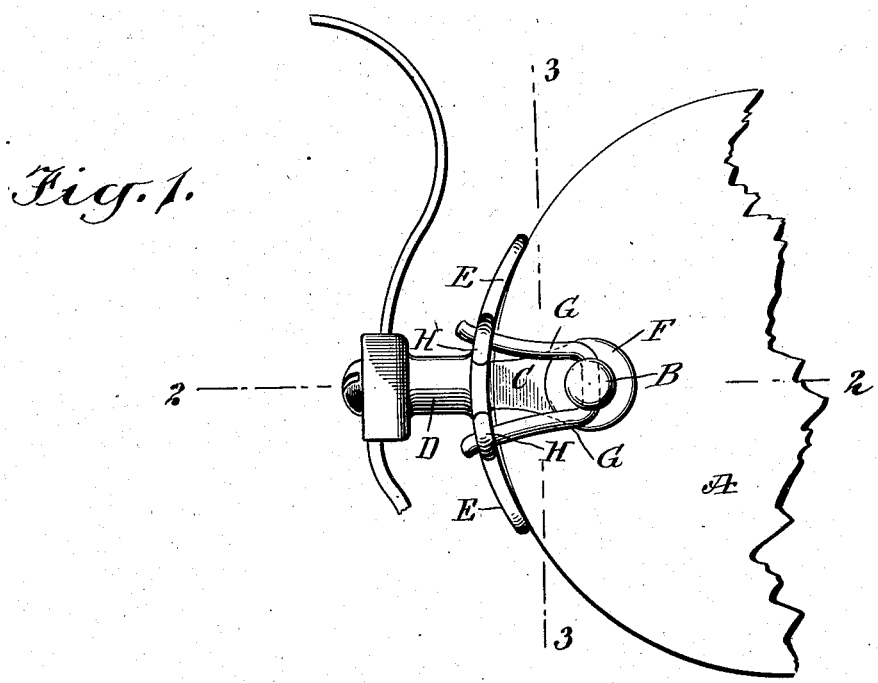
Figure 2:
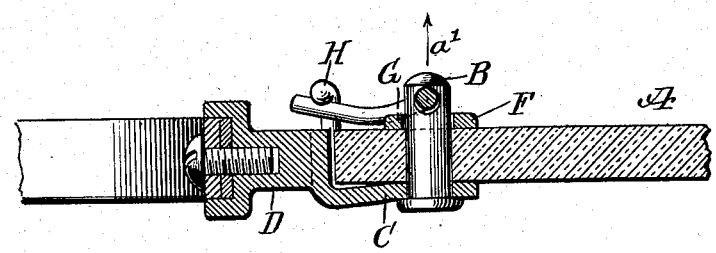
Figure 3:
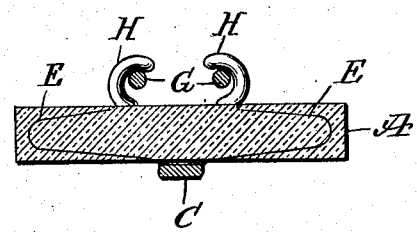

Figure 1 is a face view of the improvement as applied to eye glasses; Fig. 2 is a sectional plan view of the same on the line 2—2 of Fig. 1; and Fig. 3 is a cross section of the same on the line 3—3 of Fig. 1.

Each lens A of a pair of eye glasses or spectacles, is apertured for the passage of a stud B held on a lug C engaging one face of the lens A, and extending integrally from the usual post D, provided with braces E fitting onto the peripheral edge of the lens A. On the free end of the stud B is held a washer F resting on the other face of the lens A, and this free end of the stud B is provided with an aperture adjacent to the washer F, and through the aperture extends a pin G bent into U-shape and engaging with its terminals retaining hooks H formed on the base of the post D. The pin G is preferably made of spring wire and bent to bear on the washer F (see Fig. 2), to press the stud axially in an outward direction, as indicated by the arrow $a'$, thus holding the lug C and the washer F firmly in contact with the opposite faces of the lens A, and thereby securely fastening the lens in place on the post D of the frame of the eye glasses or spectacles.

It is understood that the pin G forms a locking device for the stud B, to securely hold the stud B in position.

The stud B may be made integral with the lug C, if desired, or the stud may pass through the lug, as shown; the stud head abutting on the outer face of the lug C.

By the arrangement described an exceedingly simple fastening is provided without the use of screws, the fastening securely holding the lens in place on the post.

Having thus described my invention, I claim as new and desire to secure by Letters Patent:

1. The combination with a lens, of a frame having a lug for engaging the one face of the lens, said lug being provided with a lateral stud and the lens with an opening through which the stud passes, the free end of the stud being transversely apertured, a washer on the stud and engaging the other face of the lens, and a substantially U-shaped spring pin whose body portion passes through the apertured end of the stud, the arms thereof being bent downwardly to press against the washer and thence upwardly, and hooks on the frame for engagement by the arms whereby to exert a lifting action on the stud.

2. The combination with a lens, of a frame having a lug engaging one face of the lens and provided with a stud, the lens having an opening through which the stud passes, a washer on the stud engaging the other face of the lens, and a spring pin traversing the end of the stud and provided with a bent down portion for engaging the washer, and means on the frame for engaging the free end of the stud.

3. The combination with a lens, of a frame, having a lug for engaging one face thereof and a stud, the lens having an opening through which the stud passes, a spring pin arranged transversely of the stud, and means on the frame for engaging the free end of the stud, said pin having a bent down portion for the purpose set forth.

4. The combination with a lens having an opening therethrough, of a frame provided with a lug having a lateral stud passing through the opening, said lug engaging one face of the lens, and a spring pin connected with the stud and the frame on the opposite side of the lens, and provided with a depressed portion at the center thereof for the purpose set forth.

In testimony whereof I have signed my name to this specification in the presence of two subscribing witnesses.

ISIDOR COLEMAN.

Witnesses:
   Theo. G. Hoster,
   John P. Davis.